Feb. 10, 1925.
J. BABEK, JR
1,525,489
AUTOMOBILE JACK
Filed July 9, 1924
3 Sheets-Sheet 3
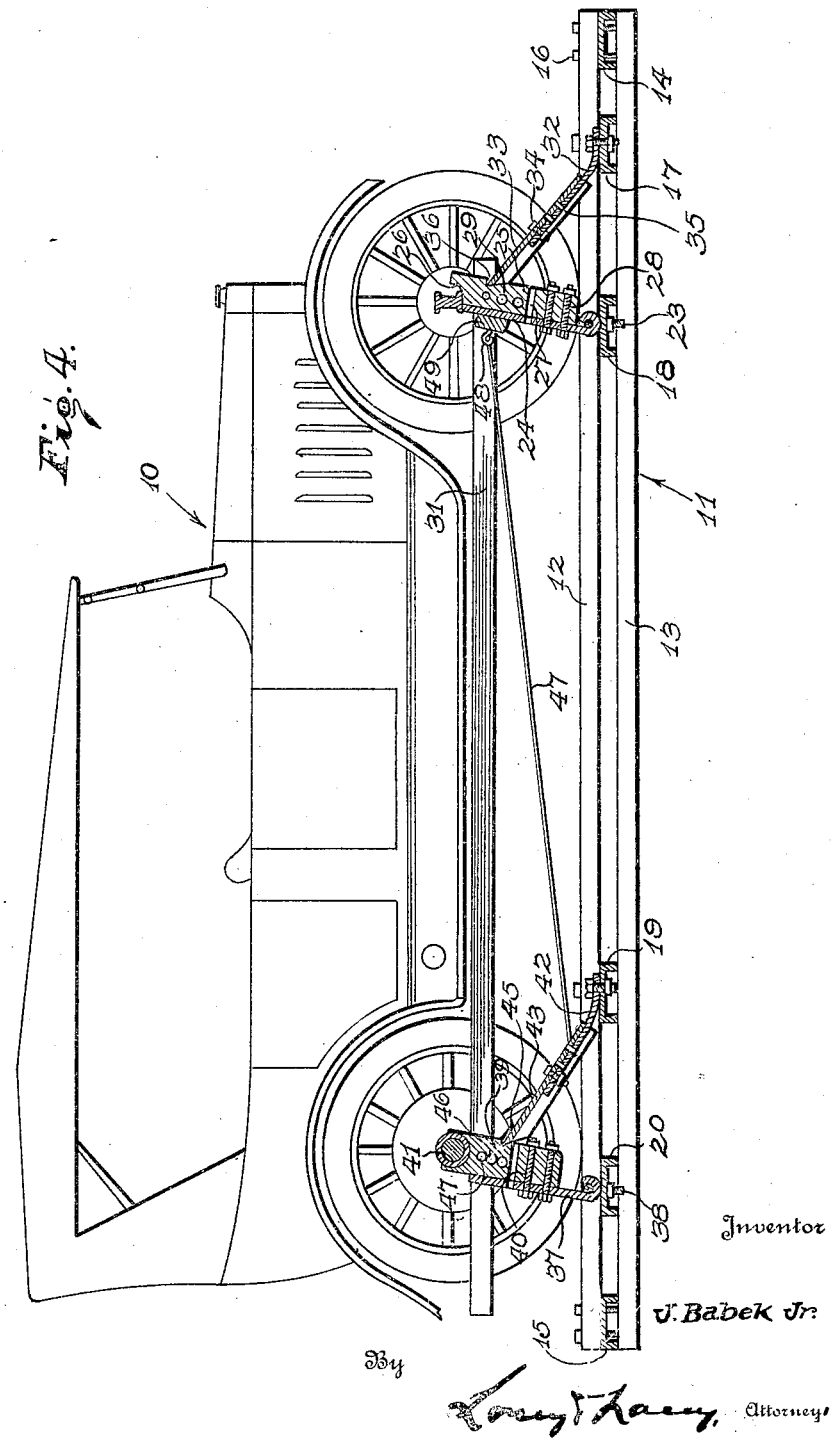

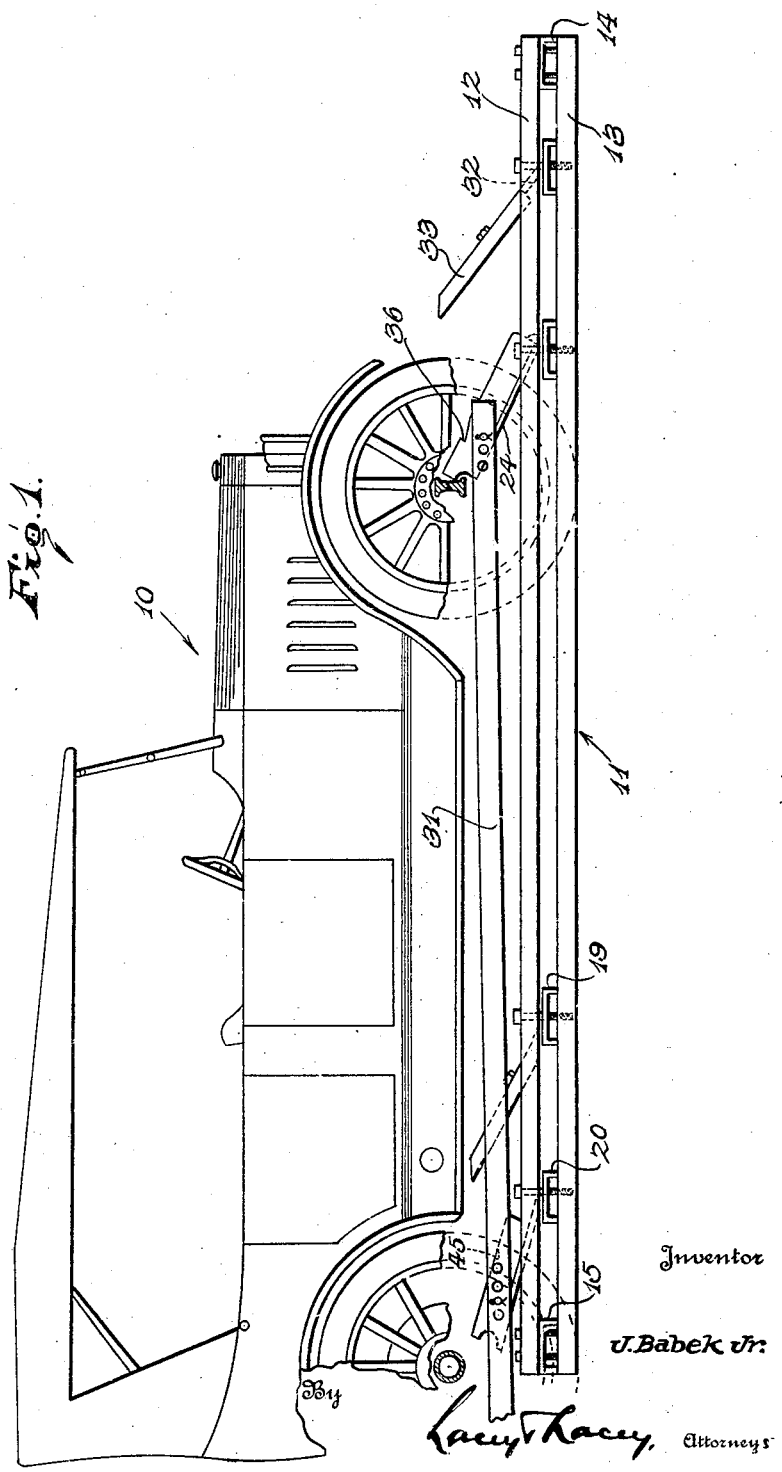

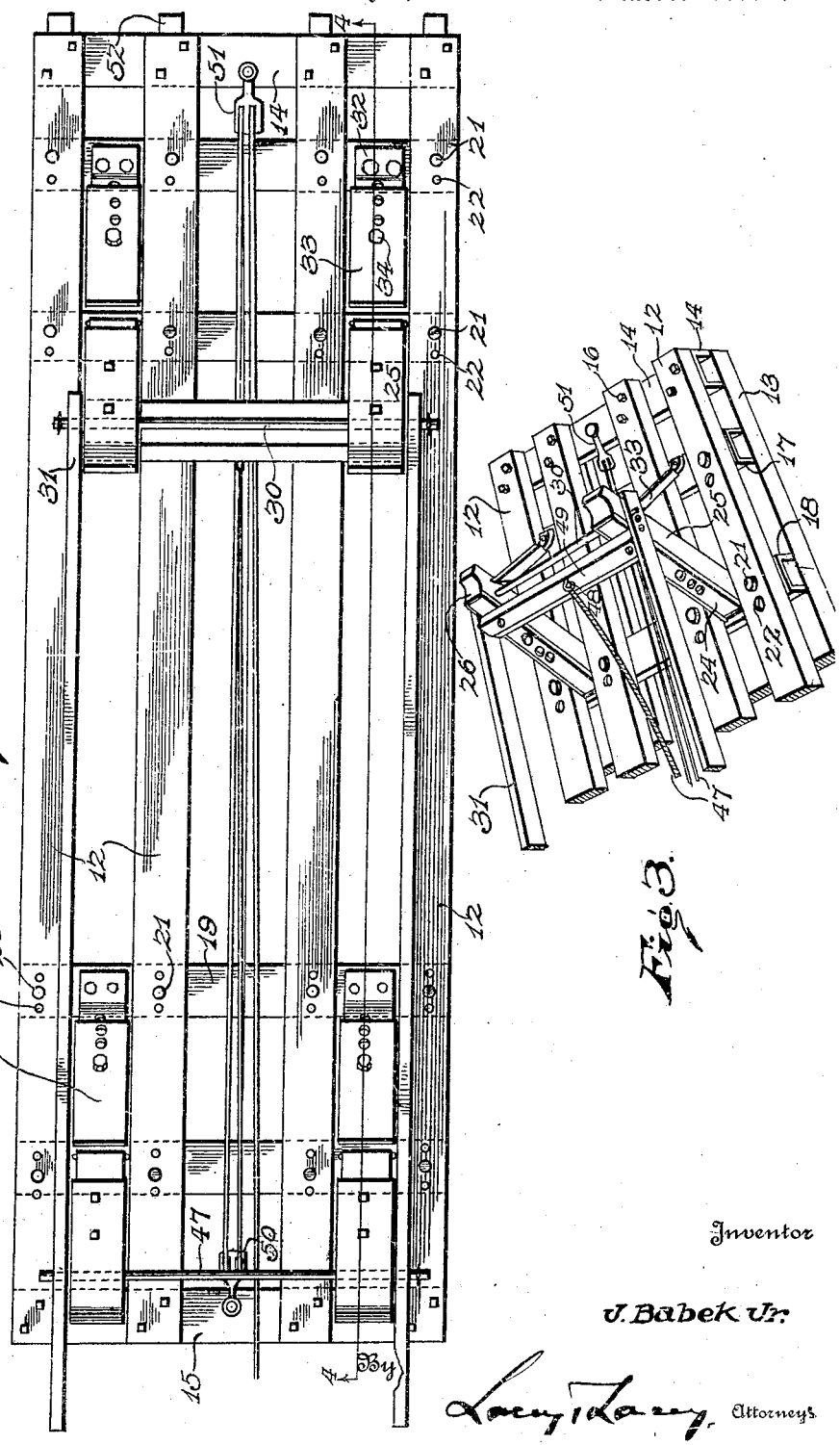

Patented Feb. 10, 1925.

1,525,489

UNITED STATES PATENT OFFICE.

JOE BABEK, JR., OF GRANITE, OKLAHOMA.

AUTOMOBILE JACK.

Application filed July 9, 1924. Serial No. 724,985.

*To all whom it may concern:*

Be it known that I, JOE BABEK, Jr., a citizen of the United States, residing at Granite, in the county of Greer and State of Oklahoma, have invented certain new and useful Improvements in Automobile Jacks, of which the following is a specification.

The present invention relates to a device for automatically raising an automobile from the ground and retaining the same in raised position as long as the automobile is stored or not in use.

The object of the invention is to relieve the pressure on the pneumatic tires as long as the car stands idle and in this manner preserve the life of the tires and make the inflation of the same at short intervals unnecessary. The device is so arranged that upon driving a car into storage both wheel axles will register with lifting arms and the momentum of the car will cause these arms to rise and lift the car from the ground. When the car is to be used again, these lifting arms are lowered by a simple tackle arrangement so that the car can be backed from the lifting jack ready for operation.

This automatic lifting jack is also useful in changing or repairing car wheels. As the wheels do not touch the ground when the car is supported on the lifting jack, it is evident that the air pressure in the pneumatic tires is preserved a considerably longer time than when the wheels have to constantly support the entire weight of the car. As a car is seldom in use more than from six to nine hours a day, the preservation of the air pressure will naturally be quite considerable.

In the accompanying drawings, one embodiment of the invention is illustrated, and Figure 1 is a side elevation of an automobile in position to be lifted by the jack;

Fig. 2 is a top plan view of Figure 1 with the car removed;

Fig. 3 is a fragmentary perspective view of the forward end of the jack, and

Fig. 4 is a view similar to Figure 1 with the car resting on the jack and lifted from the ground.

In the drawings, the reference numeral 10 represents an automobile of any type and the reference numeral 11 represents the jack for lifting the automobile from the ground. The jack consists of a base having upper and lower runners 12 and 13 spaced from each other by cross bars 14 and 15 at the front and rear ends thereof. These runners and the cross bars are permanently secured together by means of bolts 16. The cross bars are preferably made from iron channel sections with their side flanges pointing downwards. There are preferably four pairs of these runners 12 and 13 forming a rectangular frame, as best seen in Figure 2. Across the frame and between the upper and lower runners 12 and 13 are placed four movable cross bars 17, 18, 19 and 20 which fit loosely between the runners and are supported by the bottom ones. These movable cross bars are provided with apertures for securing pins or bolts 21 and the runners are provided with a series of corresponding apertures 22 for each of the movable cross bars so that it is possible to shift these cross bars back and forth on the frame. This arrangement is made in order to accommodate the jack for different lengths of cars having different distance between their wheel axles.

On the movable cross bar 18 is pivotally supported by means of U-bolts 23 swinging arms 24. On the forward side of these arms are bolted blocks 25 provided with seats 26 at their upper ends adapted to accommodate the front axle of an automobile. There is provided a series of bolt holes 27 for the bolts 28 securing the blocks on the arms 24 in order that the height of the seats 26 from the ground may be adjusted in accordance with the diameter of the wheel of the automobile to be supported. A series of transverse openings 29 is also furnished in the blocks 25 in order to accommodate a connecting rod 30 in adjustable positions from the ground. There is one of these arms 26 on each side of the frame and the rod 30 runs through both of these and supports on its free ends a pair of connecting rods 31 running to the rear end of the frame.

In front of the movable cross bar 18 is situated another movable cross bar 17 upon which is secured a standard or prop 32 with an abutment plate 33 secured thereon by bolts 34. In this case also adjustment is possible between the abutment plate 33 and the standard 32 because a series of bolt holes 35 have been provided in both the abutment plate and in the standard. The upper end or nose of the abutment plate 33 is adapted to engage in a notch 36 furnished on the forward side of the block 25. The arrangement is now made so that, when the abutment plate 33 engages in the notch, the block 25 and the arm 24 lean forwardly beyond the vertical plane through the axis of the hinge, as clearly seen in Figure 4.

The movable bar 20 which is also adjustably secured in the frame by the bolts or pins 21, as already described in connection with the other movable bars, has pivoted thereupon arms 37 by means of U bolts 38. These arms also carry blocks 39 which may be adjusted up and down upon the arms by means of bolts 40 and the upper ends of the blocks 39 have seats 41 adapted to accommodate the rear axle of an automobile. The fourth movable block 19 which is adjustable in the same manner as the others carries standards 42 bolted thereon and provided with abutment plates 43 adjustably secured on the standards by means of bolts 44. As already described in connection with the abutment plates 33, these rear abutment plates 43 also are adapted to engage in notches 45 provided on the forward side of the blocks 39 when said blocks lean forwardly of the vertical planes running through the hinge axis. A series of apertures 46 running transversely through the blocks 39 are provided for a rod 47 adapted to engage with the rear ends of the connecting bars 31.

In order to swing the supporting arms 34 and 37 to the rear to deposit the automobile on the ground, a tackle and blocks 47 are provided. One end of the tackle is secured in a staple 48 carried by a slat 49 connecting the forward arms 24 and a double block 50 for the tackle is secured on the rear fixed cross bar 15 and another similar block 51 secured on the front fixed cross bar 14, as best seen in Figure 2. The free end of the tackle is taken beyond the rear end of the frame and by a pull thereon it is evident that the arms will first be raised into perpendicular position and then fall back to deposit the automobile on the ground while releasing itself from the abutment plates 33 and 43. The frame or base 11 should be firmly anchored on the floor of the garage in any suitable manner, as, for instance, by stakes 52 to prevent the sliding thereof on the ground when the automobile runs into the garage and engages with the lifting arms 24 and 37.

When an automobile is to be stored, the lifting jack is arranged as indicated in Figure 1, that is, the tackle is released and the lifting arms are swung to the rear of the frame. When the car is run in slowly over the frame, the front axle of the automobile will first strike in the seats 26 provided on the front arms 24 of the jack. This will cause the arms to rise simultaneously dragging the rear arms with them through the connection of the bars 31. The seats 41 of the rear arms engage with the rear axle of the automobile immediately after the front axle has been firmly gripped by the front arms so that both axles start to rise almost simultaneously. The forward inclination of the arms in erected position is arranged for the purpose of obtaining assistance from gravity in retaining the automobile in raised position, as seen in Figure 4.

The runners 12 and 13 as well as the blocks 25 and 39 are preferably made of wood but all the other parts are steel or iron.

Instead of the props 32 and 42 it is evident that tension members, such as chains or cables, may be used to support the arms 24 and 37 in erected position. These tension members would then be placed to the rear instead of to the front of the arms.

Having thus described the invention, I claim:

1. A lifting jack for cars comprising a base member, arms adapted to engage the wheel axles of a car, carriers for the arms and with which the arms have pivotal engagement, props supporting the arms in erected position, other carriers for the props all of the carriers being adjustable upon the base member, and means for moving the arms from erected to reclining position, the base member including rigidly connected top and bottom runners forming a guideway between them, the carriers being slidably mounted in the guideways.

2. A lifting jack for cars comprising a base member, arms adapted to engage the wheel axles of a car, carriers for the arms and with which the arms have pivotal engagement, the arms being positively interconnected in lateral and longitudinal direction of the base member, props supporting the arms in erected position, extension elements on the arms and on the props respectively adapted to selectively change the length thereof, other carriers for the props, all of the carriers being adjustable upon the base member, and means for moving the arms from erected to reclining position, the base member including rigidly connected top and bottom runners forming a guideway between them, the carriers being slidably mounted in the guideways, said means including a block and tackle system between the arms and the base member.

In testimony whereof I affix my signature.

JOE BABEK, Jr. [L. S.]